Oct. 9, 1956 T. S. KULKA 2,765,908

RETAINER FOR TAPE WOUND ON REELS

Filed Oct. 13, 1953 2 Sheets-Sheet 1

INVENTOR
THOMAS S. KULKA
BY
Almon S. Nelson
ATTORNEY

Oct. 9, 1956 T. S. KULKA 2,765,908

RETAINER FOR TAPE WOUND ON REELS

Filed Oct. 13, 1953

2 Sheets-Sheet 2

INVENTOR
THOMAS S. KULKA
BY
Nelson S. Nelson
ATTORNEY

United States Patent Office 2,765,908

Patented Oct. 9, 1956

2,765,908

RETAINER FOR TAPE WOUND ON REELS

Thomas S. Kulka, Cleveland, Ohio

Application October 13, 1953, Serial No. 385,782

16 Claims. (Cl. 206—54)

This invention relates to the storage and handling of material and more particularly to means for retaining tape such as motion picture film or sound recording tape on a reel and preventing unwinding of the same.

Heretofore, numerous devices for retaining tape on a spool or reel have been utilized, but many of these were cumbersome and difficult to use, were prone to slip and release the tape and in some instances, required very careful manipulation in order to prevent damage to the tape.

In devices of this nature, it is extremely important that the outside dimensions of the reel and tape, which in effect forms a package, should not be increased materially since such increased dimensions would adversely affect storage and transportation of the reels in containers provided therefor and also retaining means of the type contemplated by this invention, should be relatively easy to apply and not susceptible to inadvertent displacement. It is also, highly desirable, that retaining means of the nature contemplated, should be formed of relatively lightweight, readily available materials and should be of such nature, that they will not be easily damaged in such a manner as to destroy their usefulness and efficiency.

Furthermore, in view of the fact that reels of the type utilized to receive and store motion picture film or sound recording tape are commonly formed of relatively thin, lightweight metal or plastic, the flanges of the reel are relatively flexible and consequently, cannot be depended upon to provide an anchorage for tape retaining means. Since, the hub, through which the spindle hole extends, is the only relatively rigid part of the reel, it is highly desirable, that any tape retaining means be anchored to this portion of the reel.

It is accordingly, an object of the invention to provide a retaining means for tape wound on reels, which is of lightweight, economical construction and which may be applied to a reel to retain the tape thereon, without materially increasing the over all dimensions of the reel.

A further object of the invention is the provision of a retaining means for tape wound on reels which may be economically manufactured from readily available materials by relatively simple stamping or molding operations.

A still further object of the invention is the provision of a retaining means for tape wound on reels, which may be conveniently applied to and removed from such reels without danger of damaging the tape.

Another object of the invention is the provision of a retaining means for tape wound on reels which utilizes a substantially rigid part of such reel for maintaining the retaining means in place.

A further object of the invention is the provision of a retaining means for tape wound on reels which will automatically accommodate variations in diameter of the tape.

A still further object of the invention is the provision of a retaining means for tape wound on reels which is not easily damaged to an extent impairing its usefulness.

Another object of the invention is the provision of a retaining means for tape wound on reels which may be applied to such reels, at any desired location around the periphery thereof.

Further objects and advantages of the invention will be apparent from the following description taken in conjunction with the accompanying drawing wherein.

Figures 1, 2, 3, 4, 5, 6:
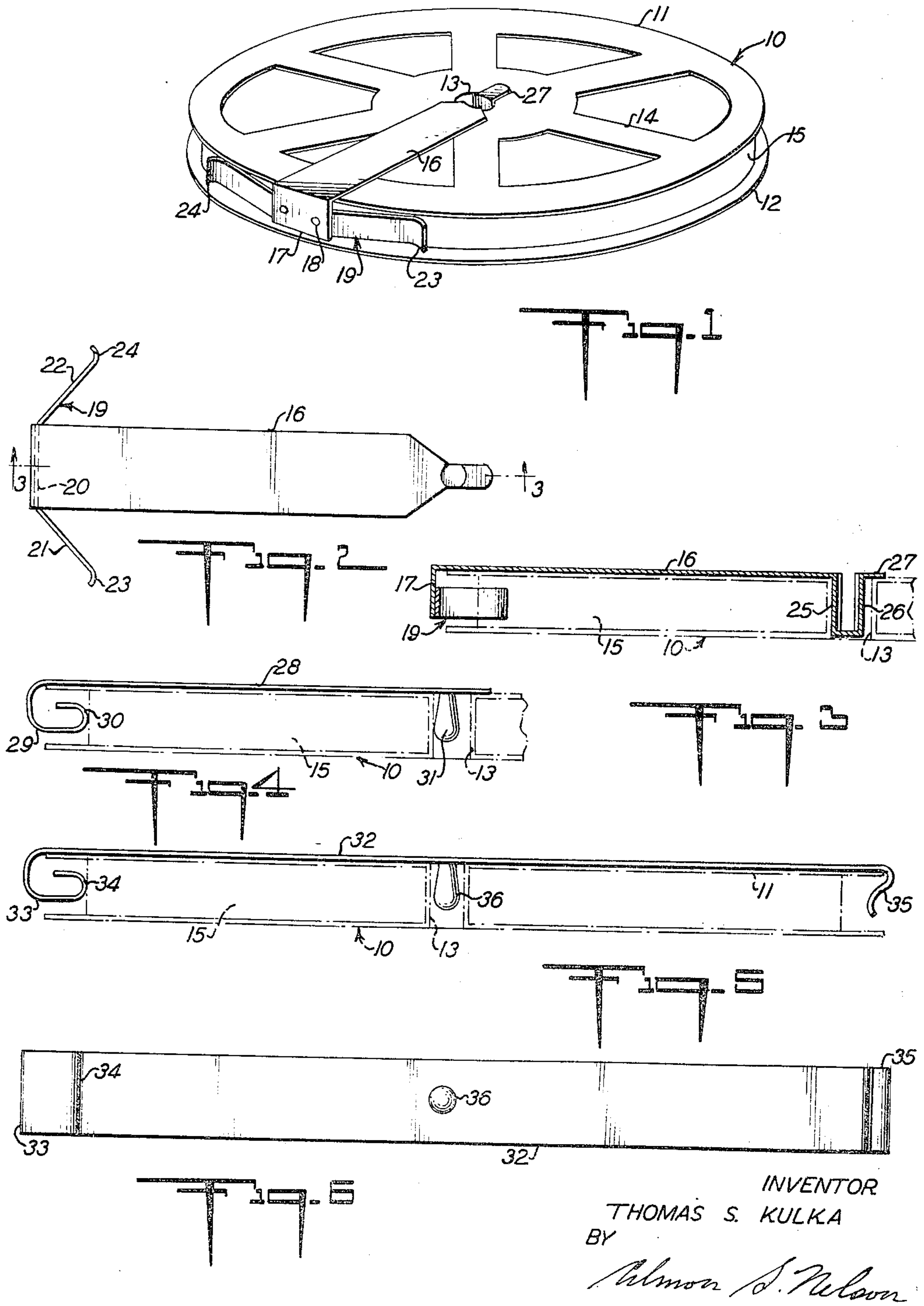
Fig. 1 is a perspective view of a reel with tape wound thereon and with one form of tape retaining means applied thereto.
Fig. 2 is a top plan view of the tape retaining means shown in Fig. 1.
Fig. 3 is a sectional view on the line 3—3 of Fig. 2 and showing the tape receiving reel in phantom.
Fig. 4 is a side elevational view of a modified form of tape retaining means with the tape receiving reel shown in phantom.
Fig. 5 is a side elevational view of a further modified form of tape retaining means with the tape receiving reel shown in phantom.
Fig. 6 is a bottom plan view of the tape retaining means shown in Fig. 5.

With continued reference to the drawing there is shown in Fig. 1, a conventional reel 10 for receiving motion picture film, sound recording tape or tape of any other nature. These reels are commonly made of lightweight metal, plastic or the like and are, of course, available in different diameters to accommodate different lengths of tape. As shown in Fig. 1, the reel 10 may well comprise spaced, substantially parallel flanges 11 and 12 connected at the center by a hub portion, not shown, through which extends a spindle receiving aperture 13. In order to decrease the weight of the reels, portions of the flanges 11 and 12 are frequently removed in order to provide spokes 14. Obviously the flanges 11 and 12 are relatively flexible and serve only to retain the tape 15 therebetween.

A tape retaining means is shown in Figs. 1 to 3, which may be manufactured of metal or a suitable plastic and which may well comprise a relatively flat, elongated body 16, slightly longer than the radius of the reel 10 to which the retaining means is to be applied. The outer end of the body 16 terminates in an angularly disposed portion 17 to which may be secured by rivets or other suitable fastening means 18, a tape engaging member 19. Member 19 is provided with a central portion 20 which engages the angular portion 17 and is secured thereto, by fastening means 18 and extending from each side of central portion 20 are angularly disposed legs 21 and 22. Legs 21 and 22 terminate at their ends in curved tape engaging portions 23 and 24 and the member 19 is formed of resilient or flexible material for a purpose to be presently described.

The opposite end of body 16 is formed with an angularly disposed, substantially U-shape portion, which is intended to be received in the spindle receiving aperture 13 of the reel 10. This U-shaped portion is composed of legs 25 and 26 and leg 26 terminates at its upper end, in an angularly extending lip 27.

In use, the retaining means shown in Figs. 1 to 3 is applied to the reel 10 to retain the tape 15 in place thereon, by engaging the curved ends 23 and 24 of the tape engaging member 19 with the tape 15 and with the body 16 overlying the flange 11 of the reel 10, at a slight inclination thereto. The body 16 is moved radially inwardly to bend the legs 21 and 22 of the member 19 and move the curved ends 23 and 24 outwardly away from each other until the U-shaped portion at the inner end of body 16 is in alignment with the spindle receiving aperture 13, at which time, the U-shaped portion is moved into the spindle receiving aperture 13 with the lip 27 and the body 16 engaging the outer side surface of the flange 11. As will be seen from an inspection of Fig. 3, the leg 25 of the U-shaped portion engages the wall of the aperture 13 and retains the curved ends 23 and 24 of the member 19 in engagement with the tape 15. If desired, the legs 25 and 26 of the U-shaped portion on the body 16, may be so formed as to tightly engage in the aperture 13 and the resiliency of such legs 25 and 26 will facilitate the easy insertion and removal thereof.

The above described tape retaining means is firmly and securely retained in place on the reel 10 until such time as it is desired to remove the same, when it is only necessary to grasp the body 16 or the lip 27 and withdraw the U-shaped portion from the aperture 13, at which time, the tape retaining means may be removed from the reel and of course, may be re-applied thereto, at any time.

The tape retaining means shown in Fig. 4 is somewhat similar to that described above and may comprise an elongated body 28 terminating at its outer end in a downwardly and inwardly curled portion 29 which terminates in a curved tape engaging portion 30. The body 28 is provided adjacent its opposite end with a plug 31 which is adapted to be received in the spindle receiving aperture 13 in the reel 10.

This form of the invention is applied and removed from the reel 10 in exactly the same manner as the form shown in Figs. 1 to 3, the curved tape engaging portions 30 being engaged with the tape and the body 28, moved radially inwardly until such time as the plug 31 is in alignment with the spindle receiving aperture 13. Engagement of the plug 31 with the wall of aperture 13 serves to retain the curved portion 30 in firm engagement with the tape 15.

In Figs. 5 and 6 there is shown a modified form of the tape retaining means shown in Fig. 4 and in this form of the invention, the elongated body 32 is of such length as to extend entirely across a diameter of the reel 10. One end of the body 32 is provided with a downwardly and inwardly curled portion 33, similar to that shown in Fig. 4 and this portion 33 terminates in a curved tape engaging portion 34. The opposite end of body 32 is provided with a downwardly and inwardly curved lip 35 and if desired, the body 32 may be provided midway of the ends thereof, with a plug 36 adapted to be received in the spindle aperture 13.

In utilizing the retaining means shown in Figs. 5 and 6 and described above, the curved portion 34 is engaged with the tape 15 and the body 32 moved radially of the reel 10 until such time as the curved lip 35 may be snapped over the opposite peripheral edge of the flange 11. At the same time, the plug 36 will enter the spindle receiving aperture 13 and will serve to prevent displacement of the body 32 in a direction parallel to the side of the reel 10. While the plug 36 is not absolutely necessary in this form of the invention, nevertheless, provision of the same is highly desirable for the purpose mentioned above.

Figures 7, 8, 9, 10, 11, 12, 13:
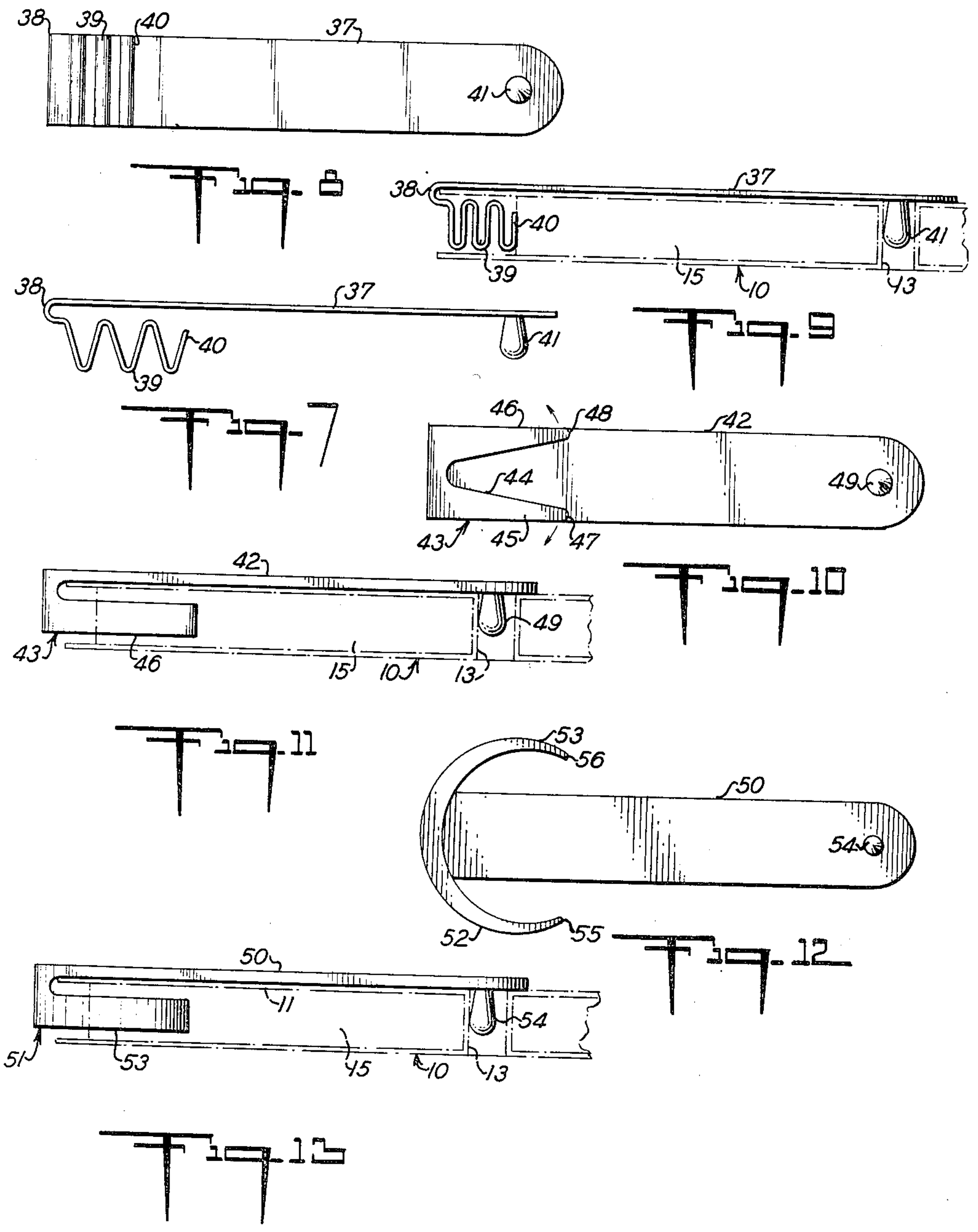
Fig. 7 is a side elevational view of a still further modified form of tape retaining means.
Fig. 8 is a bottom plan view of the tape retaining means shown in Fig. 7.
Fig. 9 is a side elevational view of the tape retaining means in place on a tape receiving reel and with such reel shown in phantom.
Fig. 10 is a bottom plan view of another form of tape retaining means.
Fig. 11 is a side elevational view of the tape retaining means of Fig. 10 in place on a tape receiving reel and with such reel shown in phantom.
Fig. 12 is a bottom plan view of still another form of tape retaining means.
Fig. 13 is a side elevational view of the tape retaining means of Fig. 12 in place on a tape receiving reel and with such reel shown in phantom.

Still another form of the invention is shown in Figs. 7 to 9 and may well comprise an elongated body 37 formed of metal, plastic or other suitable resilient material, this body 37 terminating at one end in a return bend 38. Inwardly of the return bend 38, the material of the body 37 is formed as a corrugated portion 39 terminating in a tape engaging member 40. The opposite end of body 37 is provided with a plug 41 for engaging in the spindle receiving aperture 13 of the reel 10.

In Fig. 9 this form of the invention is shown applied to a reel 10 and as will be seen, the tape engaging member 40 is in contact with the outer surface of tape 15 and the corrugated portion 39 is compressed in order to exert a yieldable force against the tape 15. Corrugated portion 39 is held compressed and body 37 is retained in position by engagement of the plug 41 with the wall of the spindle receiving aperture 13. Application and removal of the retaining means shown in Figs. 7, 8 and 9, is substantially the same as described above, in connection with the form of the invention shown in Figs. 1 to 4.

In Figs. 10 and 11 there is shown a form of tape retaining means which is preferably constructed of a yieldable material, such as rubber or the like, but which if desired, may be formed of other suitable materials. In this form of the invention there is provided an elongated body 42 terminating at one end in a downwardly and inwardly extending portion 43, spaced from the body 42. Portion 43 is formed with a V-shaped notch 44 which results in providing inwardly extending tapered legs 45 and 46, which are substantially parallel to the body 42. The ends of legs 45 and 46 are curved as at 47 and 48 in order to engage the tape 15 without damage thereto. The body 42 is provided adjacent its opposite end, with a plug 49 which serves to engage in the spindle receiving aperture 13 of the reel 10 in a manner similar to that described above, in connection with other forms of the invention.

In use, the curved portions 47 and 48 are engaged with the surface of the tape 15 and the body 42 moved radially inwardly of the reel 10 and due to the yieldability of the legs 45 and 46 such legs will substantially conform to the curvature of the surface of the tape 15. Legs 45 and 46 will, of course, be retained in engagement with the tape 15 by engagement of the plug 49 with the wall of the spindle receiving aperture 13.

The form of the invention shown in Figs. 12 and 13 is somewhat similar to the form shown in Figs. 10 and 11 and described above, and this form of the invention may well comprise a body 50 formed of yieldable material, such as rubber, which body terminates at one end, in a downwardly and inwardly extending portion 51, which as shown in Fig. 12, is comprised of legs 52 and 53 of generally half-moon configuration. Legs 52 and 53 are disposed substantially parallel to body 50 and in spaced relation thereto. The opposite end of body 50 is provided with a plug 54 for engaging in the spindle receiving aperture 13 of the reel 10.

In operation, the body 50 is positioned adjacent one side of the reel 10 and at an angle thereto, with the curved ends 55 and 56 of the arms 52 and 53 respectively, in engagement with the surface of the tape 15 on the reel 10. The body 50 is moved inwardly and due to the yieldability of the legs 52 and 53, the same will substantially conform to the surface of the tape 15 and will be retained in engagement therewith, by engagement of the plug 54 with the wall of the spindle receiving aperture 13. Removal of the device is, of course, accomplished merely by removing the plug 54 from the aperture 13 and moving the body 50 radially of the reel 10, until the arms 52 and 53 are free of the flange 11 of the reel 10.

It will be seen, that the invention, in its various forms as described above, provides a very simple and relatively inexpensive, yet highly efficient and easily usable device, for retaining a tape in position on a reel. Due to the nature of the device, the tape is only engaged by smooth or yieldable surfaces which effectively prevents damage thereto, and furthermore, the device is so constructed as to firmly retain the tape in place, regardless of small variations in diameter. Furthermore, it is to be noted, that the device cooperates with a relatively rigid part of the reel and thereby is retained in position against inadvertent displacement.

It will be obvious to those skilled in the art, that various changes may be made in the invention, without departing from the spirit and scope thereof and therefore, the invention is not limited by that which is shown in the drawings and described in the specification, but only as indicated in the appended claims.

What is claimed is:

1. For use on tape receiving reels having side flanges and a centrally disposed hub having an aperture therein, tape retaining means comprising an elongated substantially flat body, an angularly disposed portion at one end of said body, a tape engaging member secured to said portion in spaced relation to said body and including oppositely extending angularly disposed symmetrical resilient legs terminating in curved tape engaging ends, the width of said member being less than the distance between said side flanges, hub aperture engaging anchor means at the opposite end of said body comprising an integral substantially U-shaped member extending at right angles to said body on the same side of said body as said angularly disposed portion, one leg of said U-shaped member terminating in a lip disposed in the plane of said body whereby, upon engagement of said ends with the peripheral surface of a tape wound on said reel inwardly of said side flanges and insertion of said U-shaped member in said aperture said tape will be yieldably retained on said reel with said body and said lip in contact with one flange of said reel, said anchor means constituting the sole means for holding said tape retaining means in tape retaining position on said reel.

2. For use on tape receiving reels having side flanges and a centrally disposed hub having an aperture therein, tape retaining means comprising an elongated body, a tape engaging member secured to said body in spaced relation thereto and including resilient legs transversely extending on opposite sides of said body and terminating in tape engaging ends disposed symmetrically with respect to said body, the width of said member being less than the distance between said side flanges, hub aperture engaging anchor means on said body comprising a member extending at right angles to said body on the same side of said body as said tape engaging member and a lip on said last named member disposed in the plane of said body whereby upon engagement of said tape engaging ends with the peripheral surface of a tape wound on said reel inwardly of said side flanges and insertion of said last named member in said aperture, said tape will be yieldably retained on said reel with said body and said lip in contact with one flange of said reel, said anchor means constituting the sole means for holding said tape retaining means in tape retaining position on said reel.

3. For use on tape receiving reels having side flanges and a centrally disposed spindle receiving aperture, tape retaining means comprising an elongated body, an angularly disposed portion at the outer end of said body, a tape engaging member secured to said portion in spaced relation to said body and including resilient legs terminating in tape engaging ends disposed symmetrically with respect to said body, the width of said member being less than the distance between said side flanges, spindle aperture engaging means at the opposite end of said body comprising a member extending at right angles to said body on the same side of said body as said angularly disposed portion whereby upon engagement of said ends with the peripheral surface of a tape wound on said reel inwardly of said side flanges and insertion of said last named member in said aperture said tape will be yieldably retained on said reel, said anchor means constituting the sole means for holding said tape retaining means in tape retaining position on said reel.

4. For use on tape receiving reels having side flanges and a centrally disposed spindle receiving aperture, tape retaining means comprising an elongated substantially flat body of resilient material, an angularly disposed portion at the outer end of said body, an overhanging, inwardly extending curled tape engaging portion on said angularly disposed portion of said body in spaced relation to said body and transversely symmetrical therewith, the width of said tape engaging portion being less than the distance between said side flanges, and a plug secured to said body adjacent the opposite end thereof and extending at substantially right angles on the same side of said body as said tape engaging portion for insertion in said spindle receiving aperture whereby upon engagement of said tape engaging portion with a tape wound on said reel inwardly of said side flanges and insertion of said plug in said aperture, said tape will be yieldably retained on said reel, said plug constituting the sole means for holding said tape retaining means in tape retaining position on said reel.

5. For use on tape receiving reels having side flanges and a substantially centrally disposed aperture, tape retaining means comprising an elongated body of resilient material, an angularly disposed portion at the outer end of said body, an overhanging inwardly extending curled tape engaging portion on said angularly disposed portion of said body in spaced relation to said body and transversely symmetrical therewith, the width of said tape engaging portion being less than the distance between said side flanges, and a plug secured to said body adjacent the opposite end thereof on the same side of said body as said tape engaging portion and extending at substantially right angles for insertion in said aperture whereby upon engagement of said tape engaging portion with a tape wound on said reel inwardly of said side flanges and insertion of said plug in said aperture, said tape will be yieldably retained on said reel, said plug constituting the sole means for holding said tape retaining means in tape retaining position on said reel.

6. For use on tape receiving reels having side flanges and a substantially centrally disposed aperture, tape retaining means comprising an elongated body of resilient material, an angularly disposed portion at the outer end of said body, an overhanging inwardly extending curled tape engaging portion on said angularly disposed portion of said body in spaced relation to said body and transversely symmetrical therewith, the width of said tape engaging portion being less than the distance between said side flanges, and a plug secured to said body adjacent the opposite end thereof on the same side of said body as said tape engaging portion for insertion in said aperture whereby upon engagement of said tape engaging portion with a tape wound on said reel inwardly of said side flanges and insertion of said plug in said aperture, said tape will be yieldably retained on said reel, said plug constituting the sole means for holding said tape retaining means in tape retaining position on said reel.

7. For use on tape receiving reels having side flanges and a substantially centrally disposed aperture, tape retaining means comprising an elongated substantially flat body of resilient material, an angularly disposed portion at the outer end of said body, an overhanging inwardly extending corrugated portion substantially parallel to said body and extending from said angularly disposed portion in spaced relation to said body and transversely symmetrical therewith, the width of said corrugated portion being less than the distance between said side flanges, said corrugated portion terminating in a tape engaging member and a plug secured to said body adjacent the opposite end thereof on the same side of said body as said tape engaging member and extending at substantially right angles for insertion in said aperture whereby upon engagement of said tape engaging member with a tape wound on said reel inwardly of said side flanges and insertion of said plug in said aperture, said corrugated portion will be compressed to yieldably retain said tape on said reel, said plug constituting the sole means for holding said tape retaining means in tape retaining position on said reel.

8. For use on tape receiving reels having side flanges and a centrally disposed spindle receiving aperture, tape retaining means comprising an elongated body of resilient material, an angularly disposed portion at the outer end of said body, an overhanging inwardly extending corrugated portion substantially parallel to said body and extending from said angularly disposed portion in spaced relation to said body and transversely symmetrical therewith, the width of said corrugated portion being less than the distance between said side flanges, said corrugated portion terminating in a tape engaging member and a plug secured to said body adjacent the opposite end thereof on the same side of said body as said tape engaging member and extending at substantially right angles for insertion in said spindle receiving aperture whereby upon engagement of said tape engaging member with a tape wound on said reel inwardly of said side flanges and insertion of said plug in said aperture, said corrugated portion will be compressed to yieldably retain said tape on said reel, said plug constituting the sole means for holding said tape retaining means in tape retaining position on said reel.

9. For use on tape receiving reels having side flanges and a centrally disposed spindle receiving aperture, tape retaining means comprising an elongated body of resilient material, an angularly disposed portion at the outer end of said body, an overhanging inwardly extending corrugated portion integral with said angularly disposed portion and extending therefrom in spaced relation to said body, and transversely symmetrical therewith, the width of said corrugated portion being less than the distance between said side flanges, said corrugated portion terminating in a tape engaging member and a plug secured to said body adjacent the opposite end thereof and extending at substantially right angles on the same side of said body as said tape engaging portion for insertion in said spindle receiving aperture whereby upon engagement of said tape engaging member with a tape wound on said reel inwardly of said side flanges and insertion of said plug in said aperture, said corrugated portion will be compressed to yieldably retain said tape on said reel, said plug constituting the sole means for holding said tape retaining means in tape retaining position on said reel.

10. For use on tape receiving reels having side flanges and a centrally disposed spindle receiving aperture, tape retaining means comprising an elongated body of resilient material, an angularly disposed portion at the outer end of said body, an overhanging, inwardly extending, corrugated portion substantially parallel to said body in spaced relation to said body and transversely symmetrical therewith, the width of said corrugated portion being less than the distance between said side flanges, said corrugated portion terminating in a tape engaging member and a plug secured to said body adjacent the opposite end thereof on the same side of said body as said tape engaging member for insertion in said spindle receiving aperture whereby upon engagement of said tape engaging member with a tape wound on said reel inwardly of said side flanges and insertion of said plug in said aperture, said corrugated portion will be compressed to yieldably retain said tape on said reel, said plug constituting the sole means for holding said tape retaining means in tape retaining position on said reel.

11. For use on tape receiving reels having side flanges and a substantially centrally disposed aperture, tape retaining means comprising an elongated substantially flat body of yieldable material, an angularly disposed portion at the outer end of said body, an overhanging portion integral with said angularly disposed portion and in spaced relation to said body, said portion having a V-shaped notch providing tapered resilient legs symmetrically disposed transversely of said body, terminating in curved tape engaging surfaces, the width of said legs being less than the distance between said side flanges, and a plug secured to said body adjacent the opposite end thereof on the same side of said body as said legs and extending at substantially right angles for insertion in said aperture whereby upon engagement of said tape engaging surfaces with a tape wound on said reel inwardly of said side flanges and insertion of said plug in said aperture said legs will embrace said tape to yieldably retain the same on said reel, said plug constituting the sole means for holding said tape retaining means in tape retaining position on said reel.

12. For use on tape receiving reels having side flanges and a centrally disposed spindle receiving aperture, tape retaining means comprising an elongated body of yieldable material, an angularly disposed portion at the outer end of said body, an overhanging portion integral with said angularly disposed portion in spaced relation to said body, said portion having a V-shaped notch providing tapered resilient legs disposed symmetrically of said body and terminating in curved tape engaging surfaces, the width of said legs being less than the distance between said side flanges, and a plug secured to said body adjacent the opposite end thereof on the same side of said body as said legs and extending at substantially right angles for insertion in said spindle receiving aperture whereby upon engagement of said tape engaging surfaces with a tape wound on said reel inwardly of said side flanges and insertion of said plug in said aperture, said legs will embrace said tape to yieldably retain the same on said reel, said plug constituting the sole means for holding said tape retaining means in tape retaining position on said reel.

13. For use on tape receiving reels having side flanges and a centrally disposed spindle receiving aperture, tape retaining means comprising an elongated body of yieldable material, an angularly disposed portion at the outer end of said body, an overhanging portion integral with said angularly disposed portion and in spaced relation to said body, said portion having tapered resilient legs transversely symmetrical with respect to said body and terminating in curved tape engaging surfaces the width of said legs being less than the distance between said side flanges and a plug secured to said body adjacent the opposite end thereof and extending at substantially right angles for insertion in said spindle receiving aperture whereby upon engagement of said tape engaging surfaces with a tape wound on said reel inwardly of said side flanges and insertion of said plug in said aperture said legs will embrace said tape to yieldably retain the same on said reel, said plug constituting the sole means for holding said tape retaining means in tape retaining position on said reel.

14. For use on tape receiving reels having side flanges and a centrally disposed spindle receiving aperture, tape retaining means comprising an elongated body of yieldable material, an angularly disposed portion at the outer end of said body, an overhanging portion integral with said angularly disposed portion in spaced relation to said body, said overhanging portion having resilient legs transversely symmetrical with respect to said body and terminating in tape engaging surfaces, the width of said legs being less than the distance between said side flanges, and a plug secured to said body adjacent the opposite end thereof for insertion in said spindle receiving aperture whereby upon engagement of said tape engaging surfaces with a tape wound on said reel inwardly of said side flanges and insertion of said plug in said aperture said legs will embrace said tape to yieldably retain the same on said reel, said plug constituting the sole means for holding said tape retaining means in tape retaining position on said reel.

15. For use on tape receiving reels having side flanges and a centrally disposed spindle receiving aperture, tape retaining means comprising an elongated substantially flat body, a flange on one end of said body extending at right angles thereto, an inwardly extending, yieldable, tape engaging member secured to said last-named flange in spaced relation to said body and transversely symmetrical therewith, the width of said member being less than the distance between said side flanges and anchor means adjacent the opposite end of said body extending substantially at right angles thereto on the same side of said body as said flange for insertion in said spindle receiving aperture whereby upon engagement of said tape engaging member with the peripheral surface of a tape wound on said reel inwardly of said side flanges and insertion of said anchor means in said aperture, said tape will be yieldably retained on said reel, said anchor means constituting the sole means for holding said tape retaining means in tape retaining position on said reel.

16. For use on tape receiving reels having side flanges, and a centrally disposed hub having an aperture therein, tape retaining means comprising an elongated body, an angularly disposed portion on one end of said body, an inwardly extending, yieldable, tape engaging member on said angularly disposed portion in spaced relation to said body and transversely symmetrical therewith, the width of said member being less than the distance between said side flanges and angularly disposed anchor means adjacent the opposite end of said body on the same side of said body as said angularly disposed portion for insertion in said aperture whereby upon engagement of said tape engaging member with the peripheral surface of a tape wound on said reel inwardly of said side flanges and insertion of said anchor means in said aperture, said tape will be yieldably retained on said reel, said anchor means constituting the sole means for holding said tape retaining means in tape retaining position on said reel.

References Cited in the file of this patent

UNITED STATES PATENTS

| | | |
|---|---|---|
| 191,581 | Gould | June 5, 1877 |
| 331,616 | Coburn | Dec. 1, 1885 |
| 491,261 | Jenkins | Feb. 7, 1893 |
| 575,730 | Peraut | Feb. 26, 1897 |
| 595,059 | Graham | Dec. 7, 1897 |
| 695,322 | Metcalfe | Mar. 11, 1902 |
| 1,300,974 | Johannsen | Apr. 15, 1919 |
| 1,655,025 | Platten | Jan. 3, 1928 |

FOREIGN PATENTS

| | | |
|---|---|---|
| 27,139 | Great Britain | of 1910 |